United States Patent [19]

Wilkinson

[11] 4,086,518
[45] Apr. 25, 1978

[54] ON DEMAND FLUID PUMP

[75] Inventor: John Robert Wilkinson, Dearborn, Mich.

[73] Assignee: Facet Enterprises, Inc., Tulsa, Okla.

[21] Appl. No.: 709,636

[22] Filed: Jul. 29, 1976

[51] Int. Cl.$^2$ .......................................... H02K 33/00
[52] U.S. Cl. ..................................... 318/127; 417/417
[58] Field of Search .............................. 417/416–418;
310/34, 35, 24, 23; 318/126, 127, 128, 132

[56] References Cited

U.S. PATENT DOCUMENTS

| 2,686,280 | 8/1954 | Strong et al. | 318/128 X |
| 3,118,383 | 1/1964 | Woodward | 417/417 X |
| 3,729,691 | 4/1973 | Beiswinger et al. | 417/417 X |
| 3,781,140 | 12/1973 | Gladden | 417/417 X |

FOREIGN PATENT DOCUMENTS 728,771   2/1966   Canada ................................ 318/130

Primary Examiner—Donovan F. Duggan
Attorney, Agent, or Firm—Remy J. VanOphem

[57] ABSTRACT

Disclosed herein is an on-demand fluid pump having a solenoid actuated reciprocating piston. The pump's electrical circuit comprises an oscillator generating at predetermined intervals short duty cycle sample signals which are applied to the solenoid. The reciprocating piston is nonresponsive to the applied sample signals, however, the sample signals induce a signal in a position sensor. The value of the signal induced in the position sensor is a function of the piston's position. A detector circuit generates a signal switching a bi-stable electronic switch to a SET state in response to an induced signal having a value indicative of the piston being at the end of its spring actuated pump stroke. The bi-stable switch in the SET state activates the solenoid to retract the piston against the force of the spring. The next sequential sample signal resets the bi-stable switch to its RESET state deactivating the solenoid. The time interval between the sample signals is selected to be just long enough for the solenoid to retract the piston from its position at the end of the pumping stroke to its start position. The position sensor in the preferred embodiment is two spatially disposed sensing coils connected in a signal opposing relationship so that the induced signal reverses polarity when the piston is at the end of its pumping stroke.

3 Claims, 9 Drawing Figures

ON DEMAND FLUID PUMP

BACKGROUND OF THE INVENTION

1. Field of the Invention

The present invention is related to field electromagnetic fluid pumps and, more particularly, to an on-demand electromagnetic pump having a solenoid coil, position sensing coils and solid state circuitry for reciprocating a piston member.

2. Prior Art

The early reciprocating electromagnetic fluid pumps used mechanical or magnetically actuated switches to detect the end of the piston member's stroke. Activation of the switch applies power to the solenoid coil retracting the piston member back to its start position. Typical examples of such electromagnetic pumps are disclosed by L. C. Parker in U.S. Pat. No. 2,994,792 (August 1961) and E. D. Long in U.S. Pat. No. 3,361,069 (January, 1968). These switches are subject to mechanical failure as well as contact erosion and, therefore, were the primary causes of pump failure. An alternate approach to using mechanical switches was the use of an electronic oscillator which energized the solenoid coil at a predetermined interval. Some of the pumps used free running oscillators such as taught by Kofinh in U.S. Pat. No. 3,211,798 (December, 1965) or used a blocking oscillator as taught by Wertheimer in U.S. Pat. No. 3,381,616 (May, 1968). Pumps with electronic oscillators operated at a constant speed worked well for a relatively narrow band of output loads. However, the frequency of the oscillators had to be adjustable to compensate for changes in load conditions and were not well suited for applications where the load fluctuated randomly over a fairly wide range. One attempt to overcome this problem is taught by Woodward in U.S. Pat. No. 3,118,383 (January, 1964). In this patent, Woodward discloses the use of sensing coils to generate signals at one or both ends of the piston members stroke to prematurely initiate or terminate the output pulse of the multivibrator. Using this arrangement, Woodward is able to expand the operating load range of the electromagnetic fluid pump to higher loads, but the lower operating range was still determined by the natural frequency of the multivibrator. The electronic control disclosed herein overcomes the problems associated with mechanical switches and oscillating circuits discussed above.

SUMMARY OF THE INVENTION

The invention is an electronic control circuit for an electromagnetic fluid pump having a solenoid coil for retracting a reciprocating piston member to compress a drive spring and at least one sensing coil disposed to sense the position of the piston member at the end of the spring driven stroke. The electronic control unit comprises an oscillator generating sample pulse signals at predetermined intervals which are transmitted to the solenoid coil and sensed by the sensing coil. The duty cycle of the sample pulses is sufficiently short so that their effect on the displacement of the piston member by the drive spring is insignificant. A comparator detecting the output of the sensing coil generates a signal which triggers a bi-stable electronic switch circuit to energize the solenoid coil. The next sequential sample pulse resets the bi-stable switch to its initial state, terminating the energization of the solenoid coil. The time interval between the sample pulse is selected to permit the solenoid coil to be energized for a period of time just sufficient to retract the piston member to its start position.

One objective of the invention is to provide a control circuit for an electromagnetic fluid pump that is responsive to the fluid demand.

Another objective of the invention is to provide a control circuit for an electromagnetic fluid pump having a bi-stable switch circuit for energizing the solenoid coil.

Another objective of the invention is to provide a control circuit in which a sensing coil is used to detect when the piston member reaches the end of its stroke when urged by a spring member.

Another objective of the invention is a control system for an electromagnetic fluid pump having an oscillator generating sample pulses which are detected by the sensing coil to monitor the position of the piston member as it is being displaced by a drive spring.

The foregoing and other advantages of the disclosed control system will be evident from a consideration of the detailed description which follows taken together with the accompanying drawings.

DETAILED DESCRIPTION OF THE PREFERRED EMBODIMENT

Figure 1:
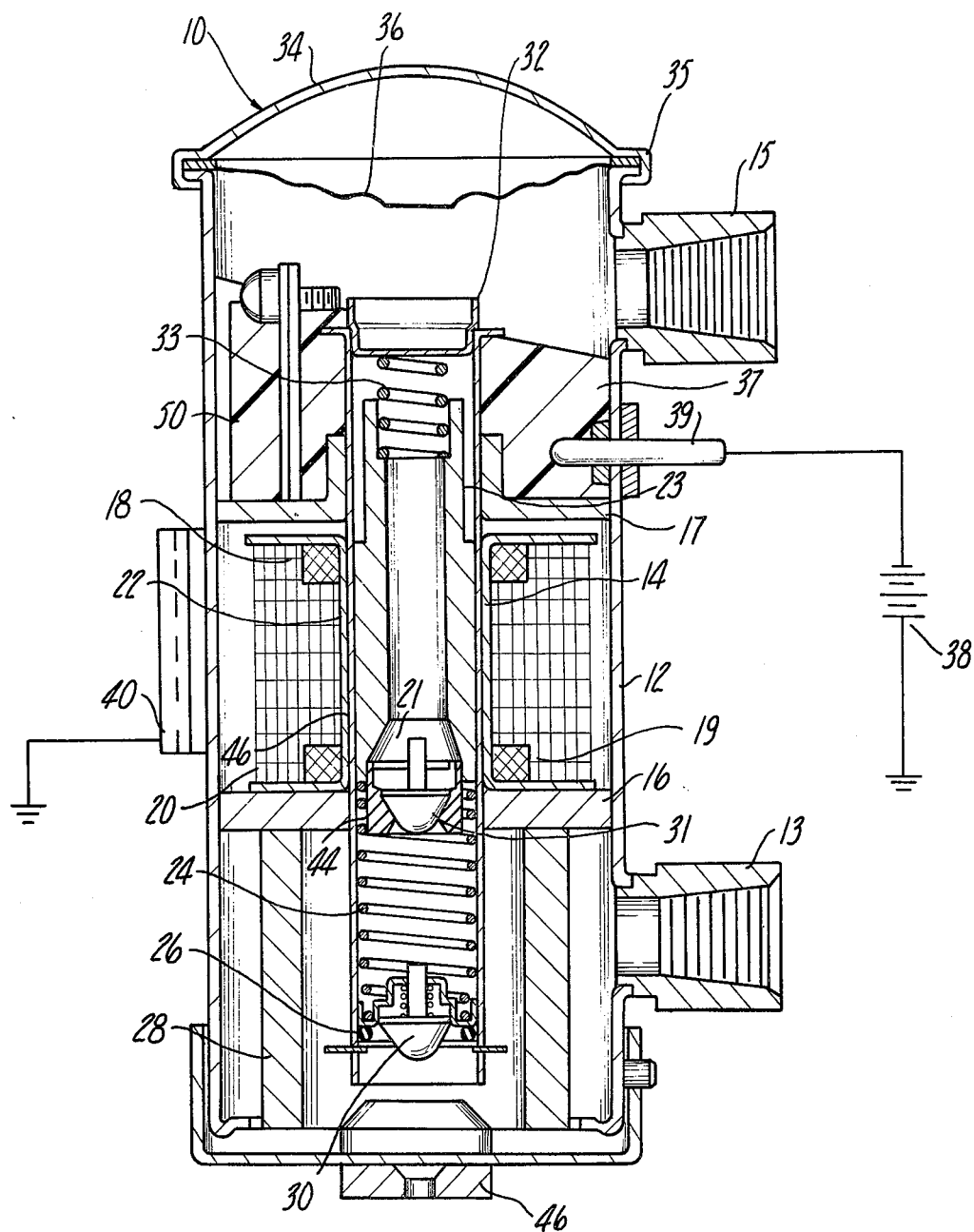
FIG. 1 is across-sectional view of an electromagnetic fluid pump in accordance with the invention.

The basic elements of an on-demand electromagnetic fluid pump are illustrated in FIG. 1. The electromagnetic fluid pump 10 comprises a generally cylindrical housing 12, with a fluid inlet 13 and a fluid outlet 15. Contained within the housing 12 is a guide or cylindrical member 14 which is supported within the housing by pole members or annular members 16 and 17. Disposed intermediate the pole members 16 and 17 are upper and lower sensing windings 18 and 19 respectively and a solenoid winding 20 which are disposed coaxially with the guide member 14. Disposed within the cylindrical member 14 is a piston member 22 which is free to move within the cylindrical member 14 with a reciprocating motion. The upper portion 23 of piston 22 is undercut to provide an air gap between piston member 22 and the guide member 14. A spring member 24 is compressively confined between a lock ring 26 at one end of the guide or cylindrical member 14 and one end of the piston member 22. A filter 28 is disposed intermediate the fluid inlet 13 and inlet 21 to the piston member 22. A plurality of valves 30 and 31 are disposed in the fluid path through the guide member 14 to prevent fluid flow other than a unidirectional flow from the inlet to outlet through the piston member 22 in the well know manner.

At the upper end of the guide member 14 is disposed an abutment member 32 which is compressively confines a spring member 33 intermediate the piston 22 and the abutment member 32. The spring member 33 provides a cushion for the piston member when it reaches the top or end of its stroke. A cap member 34 is clamped or otherwise fitted around the housing 12 as shown at 35 to provide a fluid tight seal. A diaphragm 36 is rigidly attached to the rim of the cap 34 as shown at 35 so that the interior of the cap 34 constitutes a hermetically sealed chamber. An epoxy or other moldable material 37 aids in holding the various pump parts in position and may be used to hold the electrical components which will be discussed with reference to FIG. 3. Electrical power from a source such as a battery 38 or a rectified alternating electrical power supply is input to the pump by means of an electrical feedthrough 39. The electrical circuit is completed through the housing 12 and a flange 40 which is connected to a common ground circuit back to the source of electrical power 38.

The details of the piston 22 and its relationship to the sensing coils 18 and 19 and the solenoid coil 20 are illustrated on FIG. 2. As previously discussed, the guide member 14 is supported within the housing 12 by the pole member 16 and 17. The upper and lower sensing coils 18 and 19 respectively are disposed between the pole members 16 and 17 concentric with the guide members as shown. Sensing coil 18 is adjacent to pole member 17 and sensing coil 19 is adjacent to pole member 16. Solenoid coil 20 is disposed between the pole members 16 and 17 and also fills the remaining volume between sensing coils 18 and 19. The piston 22 has a central portion 46, an upper undercut portion 42 and a lower undercut portion 44 and is slidably received in the guide member 14. The outside diameters of the upper and lower undercut portions 42 and 44 are slightly smaller than the outside diameter of the central portion 46, providing a clearance or gap between the external surfaces of the upper and lower undercut portions and the internal surface of guide member 14. The length of the central portion 46 is slightly longer than the distance between the two sensing coils 18 and 19. In the preferred embodiment, the length of the central portion 46 is equal to the space between sensing coils 18 and 19 plus the width of one of the sensing coils so that when the top of the central portion 46 is even with the top of sensing coil 18, the bottom of the central portion 46 is even with the top of the sensing coil 19.

Figure 2A:
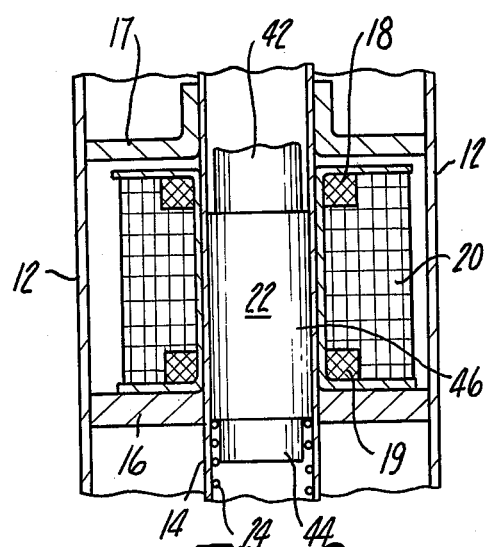
FIG. 2a is a partial cross section of the pump showing the position of the piston at the start of the pump stroke.

At the start of the pump stroke, the piston 22 is retracted downwardly compressing spring 24 as shown in FIG. 2a. In this position, the central portion 46 is adjacent to sensing coil 19 as shown while the upper undercut portion 42 is adjacent to sensing coil 18. In the null position, FIG. 2b, the top and bottom of central portion 46 is intermediate the regions or both sensing coils. At the end of the stroke, FIG. 2c, the upper end central portion 46 is adjacent to sensing coil 18 and the lower undercut portion 44 is opposite sensing coil 19.

Figure 3:
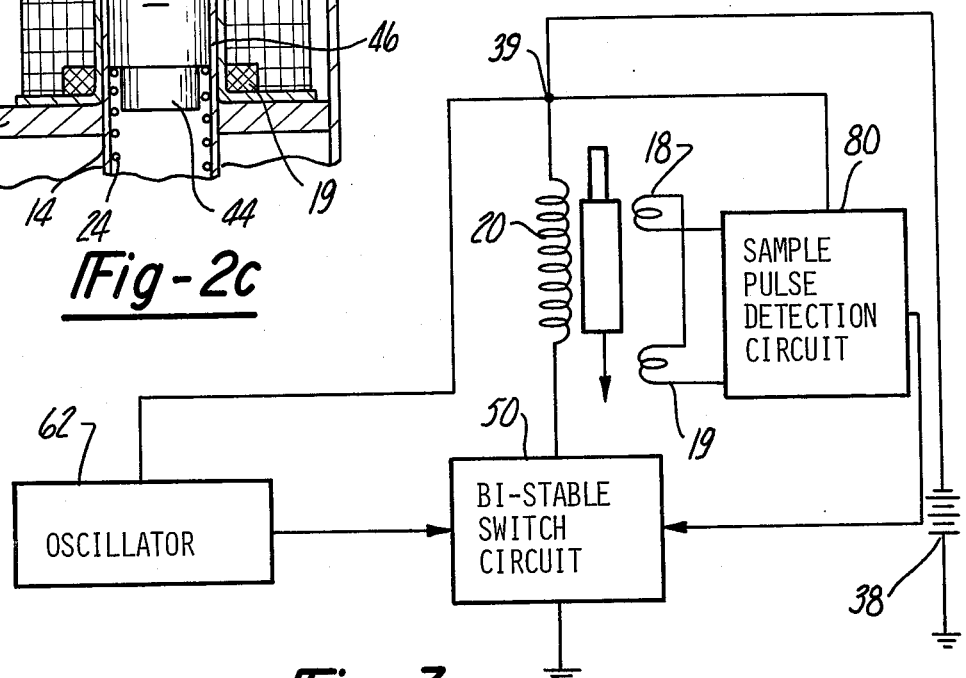
FIG. 3 is a block diagram showing the basic elements of the disclosed control system.

The details of the electronic control are shown in the block diagram illustrated in FIG. 3. Power from a source of electrical power such as battery 38 is applied to the feedthrough 39 which is connected to one end of the solenoid coil 20, the osillator 62 and the sample pulse detection circuit 80. Current flow through the solenoid coil 20 is controlled by bi-stable switch circuit 50 which receives sample pulse signals from the oscillator 62 and sample pulse detection circuit 80.

Energizing solenoid coil 20 moves the piston member 22 towards the bottom end of guide member 14 in the direction towards the sensing coil 19 as shown by arrow A. When the power is terminated, the spring member 24 urges piston member 22 in the opposite direction towards sensing coil 18. The oscillator 62 continuously generates a series of low duty cycle sample pulses which are amplified by the bi-stable switch circuit 50 and energize the solenoid coil 20 for a short time interval equal to the pulse width of the sample pulses. The magnetic field generated by the solenoid coil 20 during these short intervals of energization is not sufficient to move the piston member against the spring member 24, and therefore, has little or no effect on the displacement of the piston member by spring member 24.

Figure 2B:
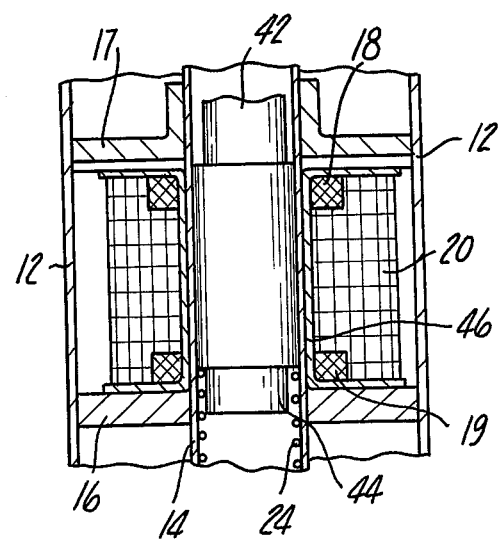
FIG. 2b is a partial cross-section of the pump showing the position of the piston at the null position of the pump stroke.
Figure 2C:
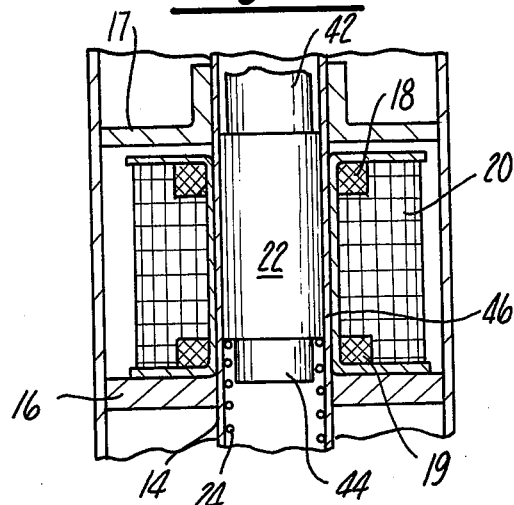
FIG. 2c is a partial cross section of the pump showing the position of the piston at the end of the pump stroke.

The magnetic field generated by the solenoid coil in response to the sample pulses, however, will induce signals in the two sensing coils 18 and 19, which are serially connected between signal input terminals of sample pulse detection circuit 80. The two sensing coils are connected as shown so that the signal induced in sensing coil 18 is opposed to the signal generated in sensing coil 19. When the piston member 22 is in a retracted position as shown in FIG. 2a, the signal generated by sensing coil 19 predominates and there is no output from the sample pulse detection circuit 80. At the end of a pumping stroke, the piston member 22 is at its uppermost position as shown in FIG. 2c and the central portion 46 of the piston 22 is adjacent to sensing coil 18. This reduces the air gap between the piston 22 and sensing coil 18 and causes the signal induced in sensing coil 18 to be greater than the signal induced in sensing coil 19. The difference in the induced signals is sensed by the sample pulse detection circuit 80 which generates an output signal triggering the bi-stable switch 50 to a full conductive states. The bi-stable switch 50 remains in this full conductive state until reset to its initial state by the next sequential low duty cycle pulse from the oscillator 62. The interval between the low duty cycle pulses generated by the oscillator 62 is selected so that the solenoid coil 20 is activated for a time sufficient to retract the piston fully against the force of spring member 24 to the start position as shown in FIG. 2a. The bi-stable switch 50 is returned to its initial state by the next sequential low duty cycle pulse signal, and the piston member is again urged towards sensing coil 18 by spring member 24. The bi-stable switch again will allow current to flow through the coil 20 for short intervals of time in response to the signals from the oscillator 62 until the central portion 46 of the piston is once more adjacent to sensing solenoid 18. Sample pulse detection circuit 80 again generates a signal setting switch 50 to fully conductive state and the pump cycle is repeated.

Figure 4:
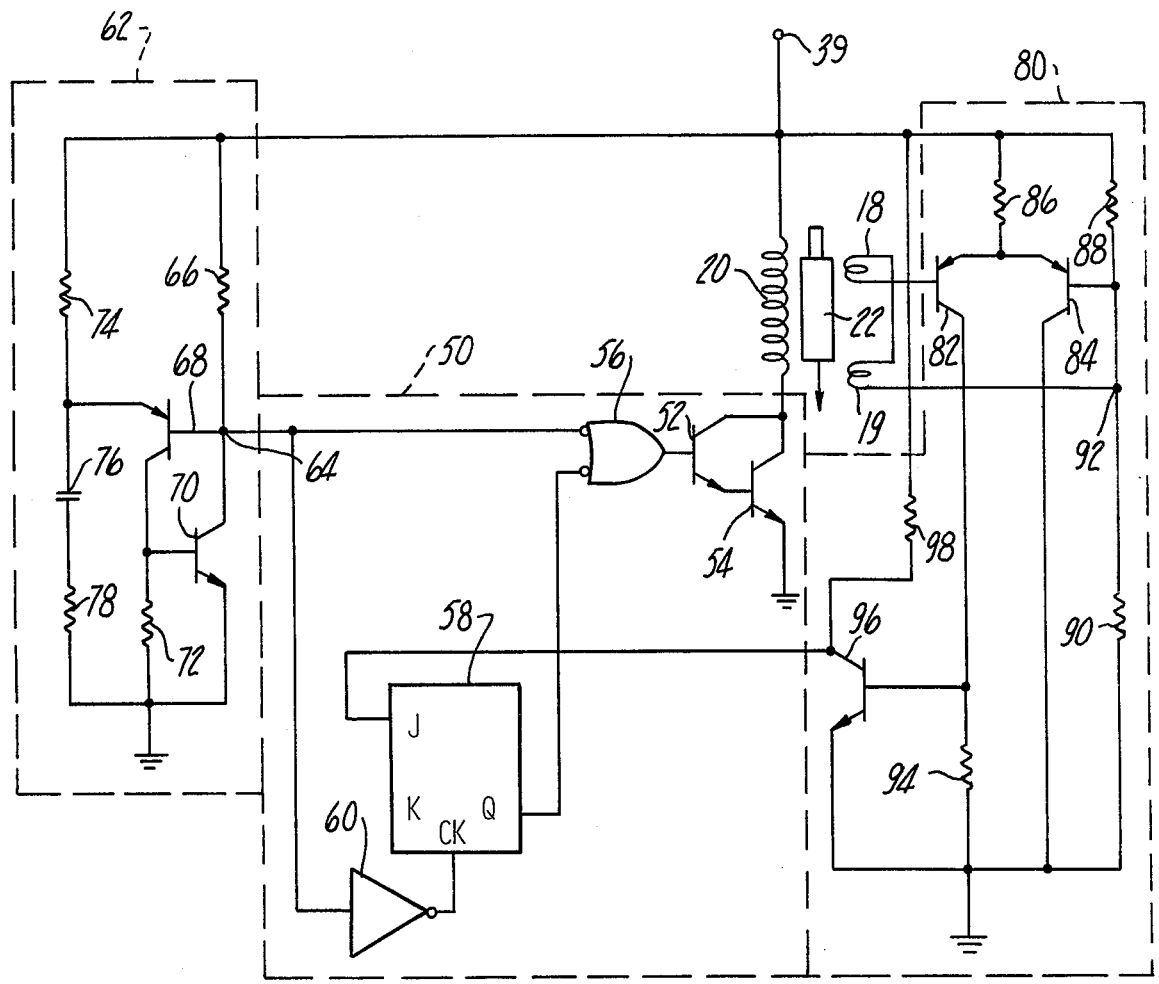
FIG. 4 is a circuit diagram of the preferred embodiment of the control system.

The details of the bi-stable switch 50, oscillator 62 and the sample pulse detection circuit 80 are shown in the circuit diagram illustrated in FIG. 4. One end of the solenoid coil 20 is connected to the feedthrough 39 receiving electrical power from a source 38 as discussed relative to FIG. 3. The opposite end of solenoid coil 20 is connected to the collectors of transistors 52 and 54. The emitter of transistor 52 is connected to the base of transistor 54 and the emitter of transistor 54 is connected to ground forming a conventional high gain Darlington amplifier. The base of transistor 52 is connected to the output of an OR gate 56. OR gate 56 is configured to generate an output signal in response to negative input signals at either of its input terminals. One of the input terminals of OR gate 56 is connected to $\overline{Q}$ output of a conventional JK flip-flop 58. The alternate input terminal of OR gate 56 is connected to a junction 64 which is the output terminal of oscillator 62. Junction 64 is also connected to an inverter amplifier 60 which has its output connected to the clock (ck) input terminal of flip-flop 58.

The output of the oscillator is Junction 64. Junction 64 is connected to the feedthrough 39 through a resistance 66, to the base of a transistor 68 and to the collector of transistor 70. The collector of transistor 68 is connected to the base of transistor 70 and to ground through a resistance 72. The emitter of transistor 70 is connected to ground. The emitter of transistor 68 is connected to feedthrough 39 through a resistance 74 and to one electrode of a capacitance 76. The opposite electrode of capacitance 76 is connected to ground through a resistance 78.

The sample pulse detection circuit 80 has two transistors 80 and 84 having their emitters connected together and to feedthrough 39 through a resistance 86. Resistances 88 and 90 are connected in series between feedthrough 39 and ground and form a voltage divider network providing a bias potential at junction 92. The base of transistor 84 is connected directly to junction 92 while the base of transistor 82 is connected to junction 92 through serially connected sensing coils 18 and 19 as shown. The collector of transistor 84 is connected to ground and the collector of transistor 82 is connected to the base of transistor 96 and to ground through a resistance 94. The collector of transistor 96 is connected to feedthrough 39 through a resistance 98 to the J input of flip-flop 58, while the emitter of transistor 96 is connected to ground.

Figure 5A:
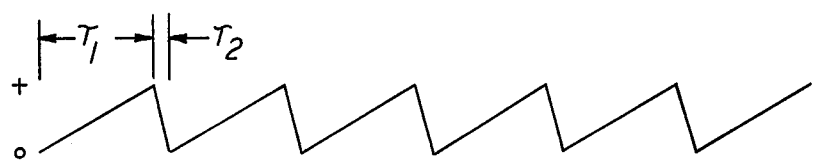
FIG. 5a is a wave form used in understanding the operation of the oscillator.

The operation of the electronic control is described with reference to FIG. 4 and the waveforms shown in FIG. 5. Applying electrical power to feedthrough 39 initiates a current flow through resistance 74 and charges capacitance 76 at a predetermined rate as shown in the time $\tau$ on FIG. 5. Simultaneously, current flows through resistance 66 to ground through the input impedences of OR gate 56 and inverter amplifier 60. This places a bias potential on the base of transistor 68 which is slightly lower than the potential applied to feedthrough 39. Transistor 68 remains blocked because the potential applied to its emitter is less than the potential applied to its base. When the charge on capacitance 76 exceeds the bias potential applied to the base of transistor 68, transistor 68 conducts supplying base current to transistor 70 causing it to conduct. Conduction of transistor 70 lowers the potential applied to the base of transistor 68. The conduction of transistor 68 increases, increasing the base current to transistor 70 causing it to become more conductive, which in turn further lowers the potential applied to the base of transistor 68. Transistors 68 and 70 quickly become fully conductive and the potential at junction 64 rapidly falls to a near ground potential as shown on waveform "b" of FIG. 5. Capacitance 76 is discharged through transistor 68, resistance 72 and resistance 78 in the time interval $\tau_2$ as indicated on wave form "a" of FIG. 5a. When capacitance 76 is discharged, current flow through transistor 68 is limited by the current flow through resistance 74, which in turn reduces the base current in transistor 70. Reduction of the current flow in base circuit of transistor 70 increases the effective resistance of transistor 70 and the potential at junction 64 rapidly returns to the initial bias potential as shown on waveform 5"b", completing a cycle of oscillation. Current flow through resistance 74 starts to charge capacitance 76 and the cycle is repeated. For the electromagnetic fluid pump illustrated in FIG. 1, the values of resistance 72, 74 and 78 and the value of capacitance 76 are selected to produce a charge time $\tau_1$ of approximately 15 milliseconds and a discharge time $\tau_2$ of approximately 0.5 milliseconds. The charge and discharge times $\tau_1$ and $\tau_2$ may, of course, be adjusted to other values according to requirements of the particular electromagnetic pump selected to be driven by the circuit.

Figure 5B:
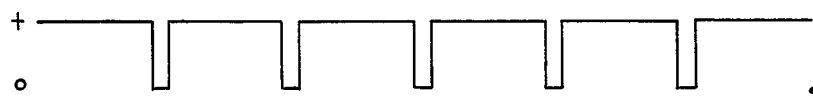
FIG. 5b is a wave form showing the sample pulse signals output by the osillator.
Figure 5C:
FIG. 5c is a wave form showing the output of the bi-stable switch.

The output of the oscillator 62 at junction 64 is a series of low duty cycle negative pulses generated at predetermined time intervals as indicated on FIG. 5b. The negative pulses generated by the oscillator 62 are received at the input terminal of OR gate 56 which generates positive pulse at the base of transistor 52. Transistor 52 responds to the low duty cycle pulses and supplies base current to transistor 54 causing transistor 54 to conduct. Conduction of transistors 52 and 54 causes current to momentarily flow through solenoid coil 20. Because of the short duration of the current flow and the inductance of the solenoid coil 20, only a weak magnetic field is generated by the coil. This weak magnetic field is insufficient to move the piston member 22 against the force of the spring member 24, but is sufficient to introduce current flows in sensing coils 18 and 19. As previously indicated, when the piston member 22 is intermediate sensing coils 18 and 19 as shown in FIG. 2b, the inducted currents are equal and opposite and, therefore, cancel each other. However, when the piston member 22 is at the end of its stroke, the air gap in the vicinity of sensing coil 18 is reduced due to the presence of the central portion 46 and the current induced in sensing coil 18 is increased. At the same time, lower undercut portion 44 is adjacent to sensing coil 19 and the signal in sensing coil is reduced. The two induced currents are now unbalanced and the series connected sensing coils 18 and 19 have a resultant current which is the difference between the two induced currents. The resultant current flow is in a direction from the base of transistor 84 to the base of transistor 82. This current flow to the base of transistor 82 is opposed the normal base current and transistor 82 becomes nonconductive. Termination of the current flow through transistor 82 terminates the base current to transistor 96 and transistor 96 becomes nonconductive and a positive pulse signal is generated at its collector. The positive pulse signal is applied to the J gate of flip-flop 58 placing flip-flop 58 in the J or set state which causes a negative signal to be generated at the $\overline{Q}$ output. The negative signal at the $\overline{Q}$ output of flip-flop 58 is applied to the alternate input terminal of OR gate 56 which generates an output signal placing transistors 52 and 54 in the conductive state. Current now flows through solenoid coil 20 which generates a magnetic field retracting the piston member 22 against the force of spring members as shown in FIG. 2a. The next sample pulse is inverted by inverter amplifier 60 and resets flip-flop 58. This terminates the negative signal generated at the $\overline{Q}$ output of filp-flop 58 which in turn terminates the conductance of transistors 52 and 54. The solenoid coil 20 is energized while flip-flop 58 is in the SET state for an interval of time sufficient to retract the piston member 22 to the start position of the pump stroke as shown in FIG. 2b. The piston member 22 now moves upward by the urging of spring member 24 at a rate proportional to the fluid demand. The position of the piston member is periodically sampled by the sample pulses generated by the oscillator 62. When the piston member again reaches the end of its stroke, the sample pulse triggers the sample pulse detection circuit 80, flip-flop again placed in its SET state and the piston member is again retracted to its start position.

Large amplitude transients induced in the sensing coils 18 and 19 when the solenoid is deactivated do not interfere with the sampling the position of the piston because of the delay introduced by the flip-flop clock signal. The solenoid coil is de-energized in much less than the delay period by allowing the Darlington amplifier comprising transistors 52 and 54 to operate in the high voltage advance mode when the Darlington amplifier is turned off.

Two important features of the disclosed control system are:

1. Piston member position is monitored at frequent intervals to determine when the end of the stroke is reached. Neither electrical noise nor momentary interruption in the source of electrical power interfere with pump operation; and 2. Using two (2) sensing coils in a series opposed mode of operation minimizes the effects of temperature and voltage fluctuation in a source of electrical power.

Although the invention has been disclosed and discussed with reference to a specific circuit, it is not intended that the invention be limited to the circuits shown. One skilled in the art will recognize that alternate circuits for performing the stated functions could readily be designed with minimal effort for the oscillator, sample pulse detection circuit, and the bi-stable switch without detracting from the spirit of the invention.

What is claimed is:

1. An on-demand fluid pump comprising:
   an electromechanical pump having a magnetically permeable piston reciprocally movable between a start position and an end position, relilient means for urging said piston to move from said start position to said end position in a variable period of time, said variable period being a function of pump load, a solenoid coil for retracting said piston from said end position to said start position in response to a current flow having a determinable duration, and sensing means generating an induced output signal in response to a current flow in said solenoid coil, said output signal having a value indicative of the position of said piston;

oscillator means for sequentially generating sample signals at predetermined intervals, said sample signals applied to said solenoid coil produce a current flow in said solenoid coil for a period of time substantially shorter than said minimum duration, and said predetermined intervals are longer than said minimum duration and substantially shorter than said variable period of time;

detection means for generating a retract signal in response to an induced output signal generated by said sensing means in response to the current flow in the solenoid coil produced by said sample signals and having a value indicative of the piston being at said end position;

bi-stable means in circuit relationship with said solenoid coil for initiating a current flow through said solenoid coil in response to a retract signal and for terminating the current flow through said solenoid coil in response to the next sequential sample signal; and a source providing electrical power to said solenoid, said oscillator means, detector means and said bi-stable means.

2. The on-demand fluid pump of claim 1 wherein:
   said sensing means is at least one sensing coil magnetically linked to said solenoid coil by means of said magnetically permeable piston;

said piston has a first portion having a predetermined diameter and a first undercut portion having a diameter smaller than said predetermined diameter, said first portion being proximate said sensing coil in said end position of said piston and said undercut portion being proximate said sensing coil in all other positions providing an air gap between said piston and said sensing coil weakening the magnetic link between said solenoid coil to said sensing coil through said piston; and said detector means is a comparator generating said retract signal in response to the change in the sampled signal induced in said at least one sensing coil when the first portion of said piston is proximate said sensing coil at the end position due to the increased magnetic link between said solenoid coil and said sensing coil.

3. The on-demand fluid pump of claim 2 wherein:
   said sensing means further includes a second sensing coil serially connected in a signal opposing manner with said at least one sensing coil, both of said sensing coils magnetically linked to said solenoid coil through said piston, said piston member further including a second undercut portion having a diameter smaller than said first portion, said second undercut portion being proximate said second sensing coil when said piston is at said end position and said first portion being proximate said second sensing coil in all other positions of said piston wherein the output signal generated by said sensing coils has a first polarity when the piston is at said end position and an opposite polarity when said piston is at all other positions; and said comparator generates said retract signal only in response to a sampled signal having said first polarity.

* * * * *

UNITED STATES PATENT OFFICE
CERTIFICATE OF CORRECTION

Patent No. 4,086,518     Dated  April 25, 1978

Inventor(s)   John Robert Wilkinson

It is certified that error appears in the above-identified patent and that said Letters Patent are hereby corrected as shown below:

Column 2, line 25, delete "across" and insert ---- a cross ----.

Column 3, line 2, delete "know" and insert ----known----.

Column 5, line 22, delete the numeral "80" and insert ----82----.

Column 6, line 19, delete "pulse" and insert ----pulses----.

Column 7, line 42, delete "relilient" and insert ----resilient----.

Signed and Sealed this

Twenty-ninth Day of August 1978

[SEAL]

Attest:

RUTH C. MASON
Attesting Officer

DONALD W. BANNER
Commissioner of Patents and Trademarks